(12) United States Patent
Lee et al.

(10) Patent No.: US 12,743,903 B2
(45) Date of Patent: Sep. 22, 2026

(54) DATA VERIFICATION TERMINAL AND DATA VERIFICATION SERVER

(71) Applicant: AuthMe Co., Ltd., Taipei (TW)

(72) Inventors: Chi-Kuang Lee, Taipei (TW); You-Sheng Shiu, Hsinchu (TW); Sin-Yi Cheng, Hsinchu (TW)

(73) Assignee: AuthMe Co., Ltd., Taipei (TW)

( * ) Notice: Subject to any disclaimer, the term of this patent is extended or adjusted under 35 U.S.C. 154(b) by 80 days.

(21) Appl. No.: 18/814,875

(22) Filed: Aug. 26, 2024

(65) Prior Publication Data

US 2025/0094614 A1 Mar. 20, 2025

Related U.S. Application Data

(60) Provisional application No. 63/534,646, filed on Aug. 25, 2023.

(51) Int. Cl.

*G06V 30/42* (2022.01)
*G06F 16/23* (2019.01)
*G06F 21/62* (2013.01)
*G06V 30/41* (2022.01)

(52) U.S. Cl.

CPC .......... *G06V 30/42* (2022.01); *G06F 16/2365* (2019.01); *G06F 21/6218* (2013.01); *G06V 30/41* (2022.01)

(58) Field of Classification Search

CPC .... G06V 30/41; G06V 30/42; G06F 16/2365; G06F 21/6218

See application file for complete search history.

(56) References Cited

U.S. PATENT DOCUMENTS 10,461,942 B1 * 10/2019 Vo .......................... H04L 9/3263
2016/0125179 A1 * 5/2016 Bouatou ................. G06F 21/32 340/5.82
2018/0234420 A1 * 8/2018 Mattes ............. G06Q 20/40145
2020/0213329 A1 * 7/2020 Simons ................... G06F 21/33
2022/0337589 A1 * 10/2022 Lee ......................... H04L 12/66
2022/0377063 A1 * 11/2022 Gomi .................... H04L 63/126
2024/0007461 A1 * 1/2024 Reed ....................... G06F 21/40
2024/0121238 A1 * 4/2024 Chin ..................... H04W 12/77
2025/0343689 A1 * 11/2025 Durski ...................... H04L 9/14
2026/0100266 A1 * 4/2026 Wisser ................... G16H 30/20

* cited by examiner

*Primary Examiner* — Dhairya A Patel

(74) *Attorney, Agent, or Firm* — ScienBiziP, P.C.

(57) ABSTRACT

An improved system for a data verification terminal and a data verification server is designed to enhance security and reliability of a verification process. The data verification server includes a server registration module, a database, a server verification module and a server authorization module. The server registration module is configured to receive a user's registration data and generate aggregated data to be stored in the database. The server verification module is configured to receive verification data from the data verification terminal and perform verification. The server authorization module is configured to select the aggregated data from the database based on a result of the verification and transmit the aggregated data to a requesting terminal or a third-party platform through a communication network.

10 Claims, 14 Drawing Sheets

DATA VERIFICATION TERMINAL AND DATA VERIFICATION SERVER

CROSS-REFERENCE TO RELATED APPLICATION(S)

The present disclosure claims the benefit of and priority to U.S. Provisional patent application Ser. No. 63/534,646, filed on Aug. 25, 2023, entitled "DIGITAL IDENTITY MANAGEMENT_SECUREID FOR PERSONAL VERIFICATION AND INTEGRATION," the content of which is hereby incorporated herein fully by reference into the present disclosure for all purposes.

FIELD

The present disclosure relates to a data verification terminal and a data verification server, and in particular to a data verification terminal and a data verification server that improve data security.

BACKGROUND

In today's digital age, data verification systems are becoming more and more important in various applications, such as online banking, e-commerce, and smart cities. However, traditional verification systems face numerous challenges, including data security, system reliability and user experience issues. Therefore, developing a data verification system that can provide high security and high reliability has become an urgent technical issue that needs to be solved.

SUMMARY

The present disclosure relates to a data verification technology, in particular to an improved system for a data verification server and a data verification terminal, aiming to improve the security and reliability of a verification process. The data verification server includes a server registration module, a database, a server verification module and a server authorization module. The server registration module is configured to receive a user's registration data and generate aggregated data to be stored in the database. The server verification module is configured to receive verification data from the data verification terminal and perform verification. The server authorization module is configured to select the aggregated data from the database based on a result of the verification and transmit the aggregated data to a requesting terminal or a third-party platform through a communication network.

The data verification terminal includes a terminal connection module, a terminal authorization module and a terminal verification module. The terminal connection module is configured to connect to the data verification server and a service platform server through a communication network. The terminal authorization module is configured to receive an authorization request from the service platform server, and the terminal verification module is configured to transmit the verification data to the data verification server through the terminal connection module, so that the data verification server transmits at least one piece of aggregated data to the service platform server.

In addition, the present disclosure discloses a specific operation process performed by the terminal connection module, and the specific operation process includes initialization of a network interface, establishment of a secure connection, data packet transmission and retransmission mechanisms, thus ensuring the stability and security of the communication process. These measures effectively enhance the security and reliability of the data verification system, thus solving the potential safety hazards in the existing technology and providing a safer and more reliable data verification solution.

In order to make the above-mentioned features and advantages of the present disclosure more obvious and understandable, embodiments are given below and described in detail with reference to the accompanying drawings.

DETAILED DESCRIPTION

Figure 1:
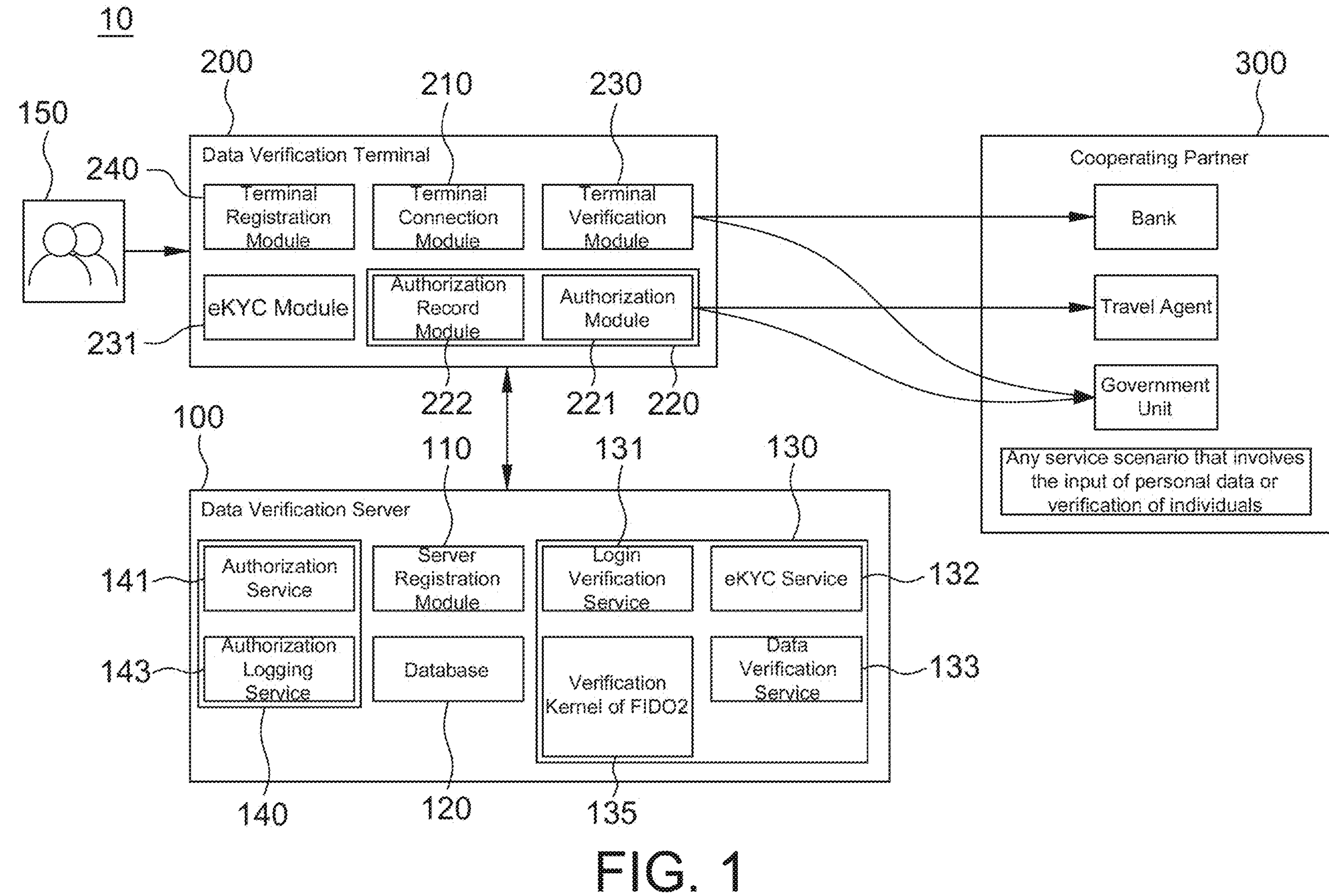
FIG. 1 is a schematic diagram of an architecture of a data verification system according to an embodiment of the present disclosure.

A more comprehensive understanding of the present disclosure will be provided with reference to the drawings of the present embodiments. However, the present disclosure may also be embodied in various forms and should not be limited to the embodiments described herein. The same or similar reference numerals indicate the same or similar components, which will not be reiterated in the following paragraphs. For the following embodiments, those skilled in the art will understand that they can be combined or matched with each other and are not independent or mutually exclusive embodiments.

Embodiment 1: Architecture and Operation of a Data Verification Server

FIG. 1 is a schematic diagram of an architecture of a data verification system 10 according to an embodiment of the present disclosure. As shown in FIG. 1, the data verification system 10 includes a data verification server 100, a data verification terminal 200 and a third-party platform 300. The data verification server 100 includes a server registration module 110, a database 120, a server verification module 130 and a server authorization module 140. Each module communicates with each other, which means that the modules can exchange information with each other regardless of whether the information is transmitted through wired connection or wireless connection or transmitted through physical connection or software packets. Each module of the data verification server 100 can be hardware, which is implemented by a general-purpose computing chip or microprocessor, or can be software, which can call functions. However, the present disclosure is not limited thereto.

The server registration module 110 is configured to receive one or more pieces of registration data from the user 150. These registration data includes, but is not limited to, the user's personal privacy information, such as phone number and personal information on various certificates. The various certificates mentioned include, but are not limited to, identity (ID) cards, health insurance cards, passports, driver's licenses, credit cards, natural person certificates, etc. These registration data can also be biometric data, such as fingerprint data, facial recognition data, etc. Specifically, the ID card information may include name, ID card number, birthday, address, spouse's name and other information. Health insurance card information may include name, health insurance card number, birthday and other information. Passport information can include Chinese name, English name, passport number, birthday and other information. Driver's license information may include name, birthday, ID number, address, driver's license number and other information. Credit card information may include credit card number, credit card expiration date, credit card number, English name and other information.

The server registration module 110 is configured to process the received registration data, generate one or more pieces of aggregated data, and store the aggregated data in the database 120. Specifically, when the user 150 accesses data or obtains services on any service platform provided by government units or non-governmental organizations, the service platform will first provide a verification method to verify personal information of the user 150. The server registration module 110 needs to process the received registration data (e.g., performing combination of the received registration data) according to the verification method provided by the service platform to generate aggregated data, and the server registration module 110 then transmits the generated aggregated data to the service platform for verification. For example, when the user 150 would like to file a tax on a tax declaration platform, one verification method is to use the phone number, the ID card number, and the health insurance card number of the user 150 for verification. Therefore, the server registration module 110 can extract the ID card number from ID card information and the health insurance card number from the health insurance card information based on the verification method and combine these extracted numbers with the phone number of the user 150 to generate a set of aggregated data. Then, the server registration module 110 will transmit the aggregated data to the tax declaration platform. In addition, after the server registration module 110 transmits the aggregated data to the tax declaration platform, the server registration module 110 can store the aggregated data in the database 120. In other words, it is not necessary to provide all the information on the ID card and health insurance card for the verification. Instead, partial information can be extracted from various identity information and then combined to form the aggregated data for the verification. In such a way, the protection of user's personal data and the unpredictability of the data required by the verification of the service platform can be improved. In other embodiments, the verification method can generate different aggregated data through different combinations of the following multiple pieces of data. The multiple pieces of data includes, but are not limited to, at least any one piece of information extracted from the ID card information of the user 150 (e.g., at least any one of the name, ID card number, birthday, address, spouse's name, etc.), at least any one piece of information extracted from the health insurance card information of the user 150 (e.g., at least any one of the name, health insurance card number, birthday, etc.), at least any one piece of information extracted from the passport information of the user 150 (e.g., at least any one of the Chinese name, English name, passport number, birthday, etc.), at least any one piece of information extracted from the driver's license information of the user 150 (e.g., at least any one of the name, birthday, ID card number, address, driver's license number, etc.), at least any one piece of information extracted from the credit card information of the user 150 (e.g., at least any one of the credit card number, credit card expiration date, English name, etc.), the contact information of the user 150 (e.g., at least any one of the email, communication software account, etc.), the phone number of the user 150, and the biometric information of the user 150 (e.g., at least any one of the fingerprint data, facial recognition data, etc.).

In another embodiment, when the user 150 accesses data or obtains services on another service platform, another verification method provided by the service platform is to use the credit card number, driver's license number, and passport number for verification. Therefore, the server registration module 110 can extract the credit card number from the credit card information, extract the driver's license number from the driver's license information, and extract the passport number from the passport information based on another verification method to generate another set of aggregated data. Then, the server registration module 110 will transmit another set of aggregated data to the service platform. In addition, after the server registration module 110 transmits another set of aggregated data to the service platform, the server registration module 110 can also store the aggregated data in the database 120.

During a data registration process, the server registration module 110 will first format the biometric data submitted by the user 150 to ensure the uniformity and standardization of the data. Then, the server registration module 110 can perform a hash operation on the data, for example, by using the SHA-256 algorithm, to generate corresponding hash values. These hash values are stored in the database as part of the aggregate data for subsequent verification.

The server verification module 130 is configured to receive verification data from the data verification terminal 200 and verify whether the terminal 200 is operated by the user 150 based on the verification data. Specifically, the server verification module 130 can compare the received verification data with verification check data stored in the database 120 to determine a verification result. When the server verification module 130 compares the received verification data with the verification check data stored in the database 120, for example, to determine whether they are the same or match, the server authorization module 140 can selectively obtain one or more pieces of aggregated data from the database and transmit the obtained aggregated data to a service platform server (not shown) in the third-party platform 300 via a communication network. In order to improve verification efficiency, the server verification module 110 can implement multi-thread processing to process multiple verification requests concurrently.

In one embodiment, the server verification module 130 can be regarded as having a login verification service module 131, an electronic Know Your Customer (eKYC) service module 132, a data verification service module 133, and a verification kernel 135 that complies with the Fast Identity Online 2 (FIDO2) project.

The login verification service module 131 is configured to accept a login request from a network side and perform a verification procedure to ensure the legitimacy and privacy of an access request received by the data verification server 100. The data verification service module 133 is configured to verify the data of individual users (e.g., customers).

The ekYC service module 132, for example, is implemented as software or hardware that can utilize different technologies for recognizing users through images (e.g., by utilizing fingerprint scanning or face recognition technologies), voiceprints or other suitable personalized features. The verification kernel 135 that complies with the FIDO2) project uses, for example, the authentication standard of Universal 2nd Factor for verification. The method using the authentication standard of Universal 2nd Factor may include, for example, that the service provider supplies the user with a personalized near-field communication card or an electronic key suitable for universal serial bus. The near-field communication card or electronic key contains a specific authentication key, allowing the server to determine, during an authentication process, whether the near-field communication card or electronic key used by the user terminal corresponds to a specific user based on the authentication key.

The server authorization module 140 establishes a communication connection between the server verification module 130 and the database 120. The server authorization module 140 may include an authorization service module 141 and an authorization logging service module 143. The authorization service module 141 selectively obtains one or more pieces of aggregate data from the database 120 based on the verification result and transmits the obtained aggregate data to the requesting terminal or third-party platform through the communication network. The authorization logging service module 143 is configured to record detailed information of each authorization operation, including authorization time, authorization object, authorization result, etc. These pieces of information can be stored in authorization records for future queries and audits.

Embodiment 2: Architecture and Operation of a Data Verification Terminal

The data verification terminal 200 includes a terminal connection module 210, a terminal authorization module 220, a terminal verification module 230 and a terminal registration module 240.

The terminal connection module 210 is configured to establish a communication connection with the data verification server 100 through the communication network to ensure that data can be transmitted safely. The terminal connection module 210 implements support for multiple communication protocols, such as HTTPS, TLS, etc., to ensure the security and integrity of data during transmission.

The terminal authorization module 220 establishes a communication connection with the terminal connection module 210. When receiving an authorization request from a service platform server in a third-party platform in the communication network, the terminal authorization module 220 can process the authorization request and transmit it to the terminal verification module 230. The terminal authorization module 220 may further include an authorization module 221 and an authorization record module 222. The authorization record module 222 facilitates the user 150 to connect to the data verification server 100 to query previous authorization records from the authorization logging service module 143.

The terminal verification module 230 is configured to verify whether the data verification terminal 200 is operated by the user 150 corresponding to the authorization request. When the terminal authorization module 220 receives the authorization request, the terminal verification module 230 can, for example, use an ekYC module 231 to obtain biometric data (such as facial image, fingerprint and voiceprint) from the user 150, and generate verification data based on the obtained biometric data, and then transmit the generated verification data to the data verification server 100 through the terminal connection module 210, thus enabling the data verification server 100 to transmit one or more pieces of aggregated data to a service platform server (not shown) in the third-party platform 300. During the process of verification, the terminal verification module 230 can also perform multi-factor verification, such as user's password, SMS verification code, etc., to improve verification security.

The terminal registration module 240 is configured to obtain the registration information of the user 150 and transmit the registration information to the data verification server 100 through the terminal connection module 210 for registration. The terminal registration module 240 can guide the user 150 through a multi-step registration process to ensure that all necessary information is completely collected and submitted.

With this architecture, the holder (e.g., user) of the data verification terminal 200 can perform access operations to the data verification server 100 through the network and finally obtain the necessary identity verification, thus securely complete the submission of personal information or authorization with a third party (such as banks, travel agents, government units).

Figure 2:
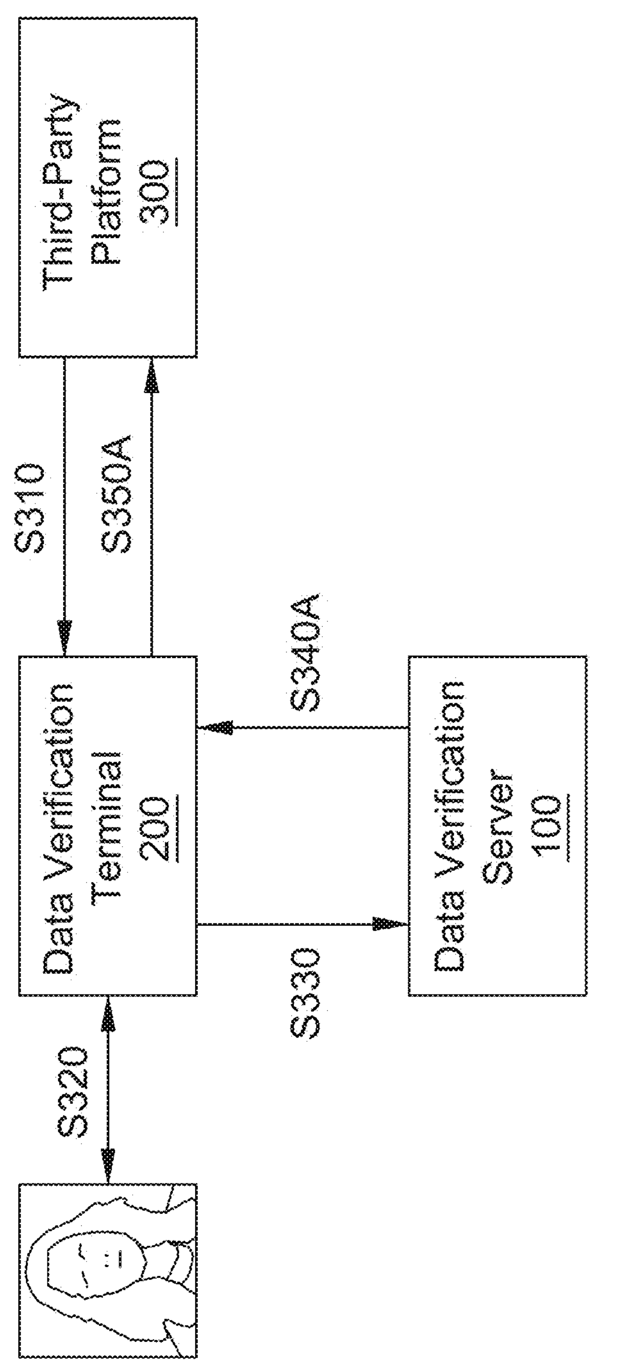
FIG. 2 and FIG. 3 are schematic diagrams of architectures and data flows of the system according to two embodiments of the present disclosure.
Figure 3:
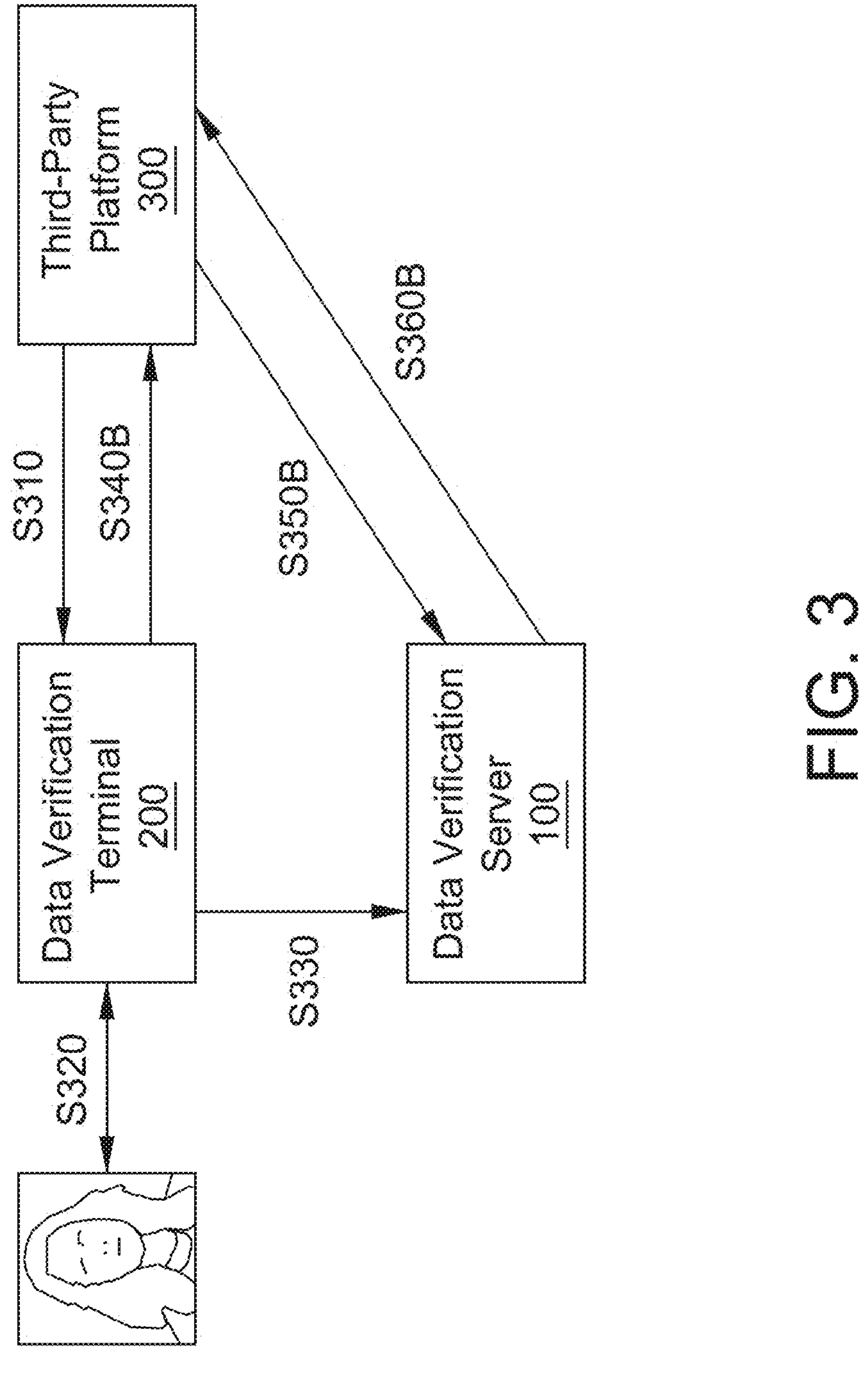

In summary, the entire process of verification can be shown in FIG. 2 or FIG. 3, which are schematic diagrams showing the system architecture and data flows of two embodiments of the present disclosure. First, in step S310, the third-party platform 300 transmits an authorization request, for example, for data access right or identity authorization verification) to the data verification terminal 200 through the communication network. Next, in step S320, the data verification terminal 200 performs identity verification. After successful verification, in step S330, the data verification terminal 200 transmits the authorization request and/or identity verification data, which can be optionally encrypted, to the data verification server 100.

Next, taking FIG. 2 as an example, in step S340A, the data verification server 100 transmits aggregated data for authorization to the data verification terminal 200. Then, in step S350A, the data verification terminal 200 transmits the aggregated data for authorization to the third-party platform 300 to complete the authorization process. The advantage of this operation is that users can operate in areas with poor wireless network signal stability, so that they can directly obtain, in advance, the authorization request from a machine (e.g., a service platform server) of the third-party platform in a place with poor wireless signal. Then, for example, the user can walk outdoors where the wireless signal is stronger to complete the authorization verification process with the data verification server 100 and finally walk indoors to complete the authorization with the machine of the third-party platform.

In addition, taking FIG. 3 as an example, in step S340B, the data verification server 200 transmits an authorization reception command, which is an access method built in the data verification server 100, to the third-party platform 300. After receiving the authorization reception instruction, the third-party platform 300 requests the data verification server 100 to confirm authorization in step S350B. Finally, in step S360B, the data verification server 100 transmits the aggregated data for authorization to the third-party platform 300 to complete the authorization. This operation method can add encryption and decryption to the data exchanged between any two parties (as described below), thereby enhancing data security.

Embodiment 3: Encryption and Decryption of Verification Data

In the present embodiment, the data verification server 100 and the data verification terminal 200 work together to encrypt the biometric data by using a hash algorithm and TOTP (Time-based One-Time Password, TOTP), and the server slide than performs decryption and verification processes.

First, the identity verification is performed by the data verification terminal 200 for the user. The terminal verification module 230 obtains the user's biometric data, such as fingerprints, facial recognition data, etc. The terminal verification module 230 generates a one-time password TOTP at the current time and performs hash processing on the obtained biometric data through the SHA-256 algorithm to generate a hash value.

Subsequently, the terminal verification module 230 uses the generated TOTP as a key to encrypt the hashed biometric data, for example, by using the AES algorithm. The terminal connection module 210 packages the encrypted verification data into data packets and attaches necessary protocol headers to the data packets to ensure that the data can be correctly parsed and processed. Then, the terminal connection module 210 transmits the encrypted verification data to the data verification server 100.

After receiving the encrypted verification data, the server verification module 130 of the data verification server 100 generates the same TOTP as the one of the terminal based on the current time and shared key and uses the generated TOTP as a key to decrypt the received encrypted verification data to obtain the hash value of the biometric data. The server verification module extracts the hash value of the corresponding user's biometric data from the database 120 and compares the extracted hash value with the decrypted hash value. If the extracted hash value and the decrypted hash value match, the verification is successful.

During the process of verification, in order to improve security, the server verification module can double-encrypt the verification data, that is, in addition to using TOTP for encryption, a server-side public key can be used for asymmetric encryption. In such a way, even if the data is intercepted during transmission, the attacker cannot decrypt the intercepted data to obtain original data, thus further improving the security of the data transmission.

Embodiment 4: Operation of Terminal Connection Module

The terminal connection module 210 of the data verification terminal 200 can initialize a network interface upon being activated and select an appropriate communication protocol, such as HTTPS. The HTTPS protocol provides a transmission encryption function that can protect a transmission process of sensitive data. During an initialization process, the terminal connection module can load necessary security credentials. These credentials are used to establish a secure SSL/TLS connection to ensure the integrity and confidentiality of data during the communication process.

After establishing an initial connection, the terminal connection module 210 queries the IP address of the server through a domain name system DNS and initiates a connection request with the data verification server 100. In order to improve the reliability of the connection, the terminal connection module implements an automatic reconnection mechanism. If the initial connection fails, the system can automatically retry within a short period of time until the connection is successfully established.

The terminal connection module 210 also provides a data packet function, which encapsulates the data to be transmitted into data packets that comply with the protocol format and attaches necessary protocol headers to ensure that the data can be correctly parsed on the server side. The data packets contains encrypted verification information, timestamps, random numbers and other information to prevent replay attacks and data tampering.

During a data transmission process, the terminal connection module 210 can segment the transmitted data, and each segment of data will be encrypted and integrity checked. The terminal connection module can use the HMAC-SHA256 algorithm to check each piece of data, generate a data integrity identifier, and attach the data integrity identifier to the data packet. After receiving the data packet, the data verification server can perform the same check operation to ensure that the received data has not been tampered with.

In addition, the terminal connection module 210 also implements a flow control mechanism to dynamically adjust the data transmission rate according to network conditions to avoid network congestion caused by sudden traffic. When an increase in network latency or packet loss rate is detected, the terminal connection module can automatically reduce the data transmission rate to ensure that data can be reliably transmitted to the server.

Embodiment 5: Application Example of Data Verification

Figure 4:
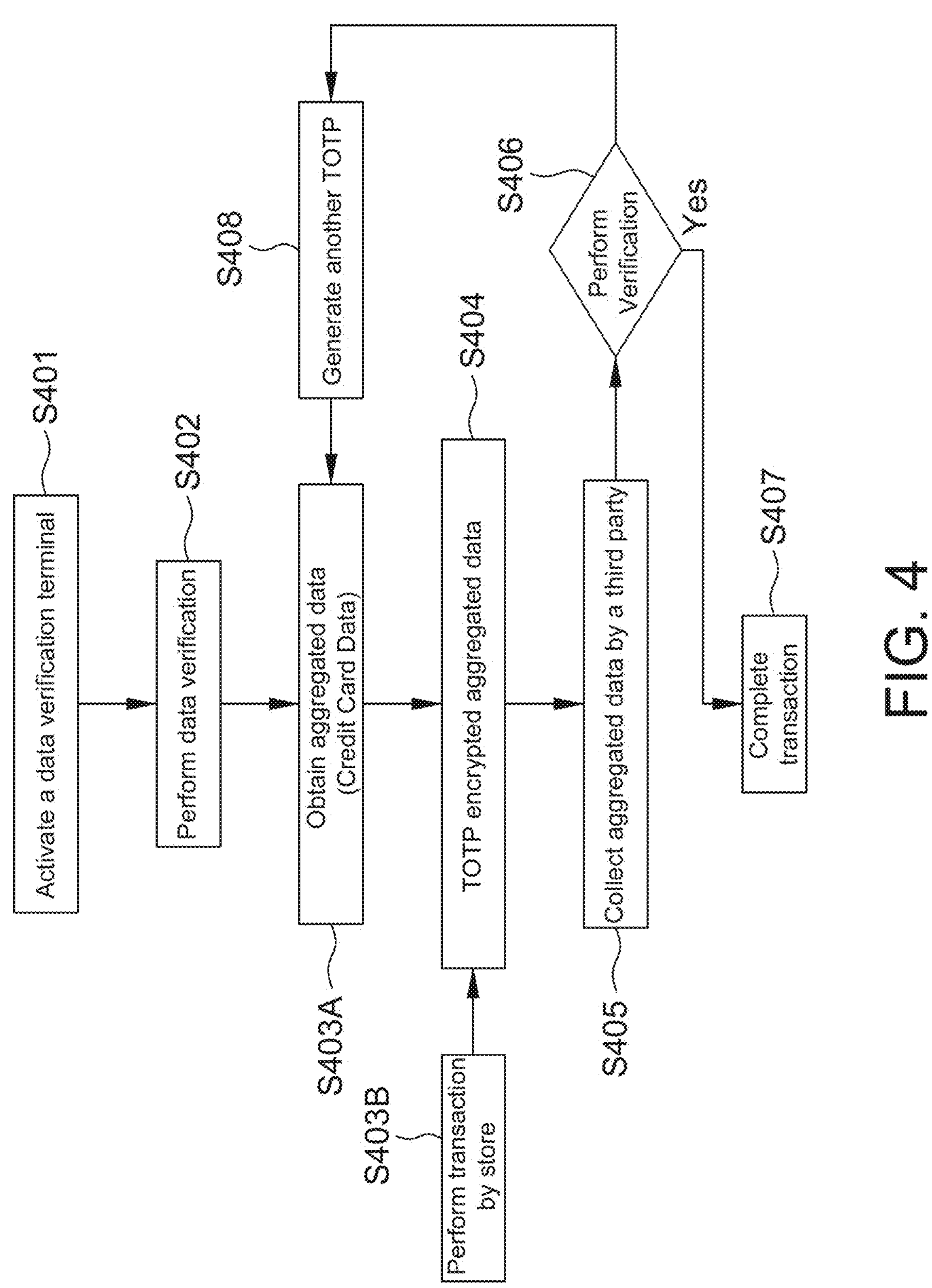
FIG. 4 is a flowchart illustrating a process performed by a data verification server and a data verification terminal for performing transaction authorization according to an embodiment of the present disclosure.

FIG. 4 is a flowchart illustrating a process performed by a data verification server and a data verification terminal for performing transaction authorization according to an embodiment of the present disclosure. First, in step S401, the user activates a data verification terminal, for example, by launching a mobile application (APP) on a mobile phone. After being launched, the APP serves as a data verification terminal and can perform data verification in step S402. In the present embodiment, a credit card payment transaction is required, so the aggregated data obtained in step S403A is the bound credit card information such as credit card number, valid month and year, billing address, cardholder name, and security verification code. In the present embodiment, in step S403B, the store performs transaction to submit data, and in step S404, the aggregated data (e.g., credit card information) will be encrypted by TOTP and then transmitted to the third party (e.g., card issuing bank or card issuing organization). In step S405, the third-party card issuing bank collects the aforementioned data (i.e., the data transmitted by the store and the aggregated data provided by the user) and performs verification in step S406. For example, if the store is a government unit or a legally exclusive enterprise (e.g., water, electricity and mass transportation enterprises), no additional verification is required according to local practices, so the verification can be directly passed with step S407 performed to complete the transaction. If the store is a general private enterprise, additional verification is often required to enhance transaction security. Therefore, if the verification fails, the process moves to step S408 to generate another TOTP and then returns to step S403A. In this process, specifically, for example, government-related transactions and airline transactions typically do not require a credit card security verification code. However, other general transactions do require a security verification code, so the aggregated data provided in step S403A can differ from complete credit card information that is always provided every time.

Embodiment 6: Application Example of Registration and Use

Figure 5:
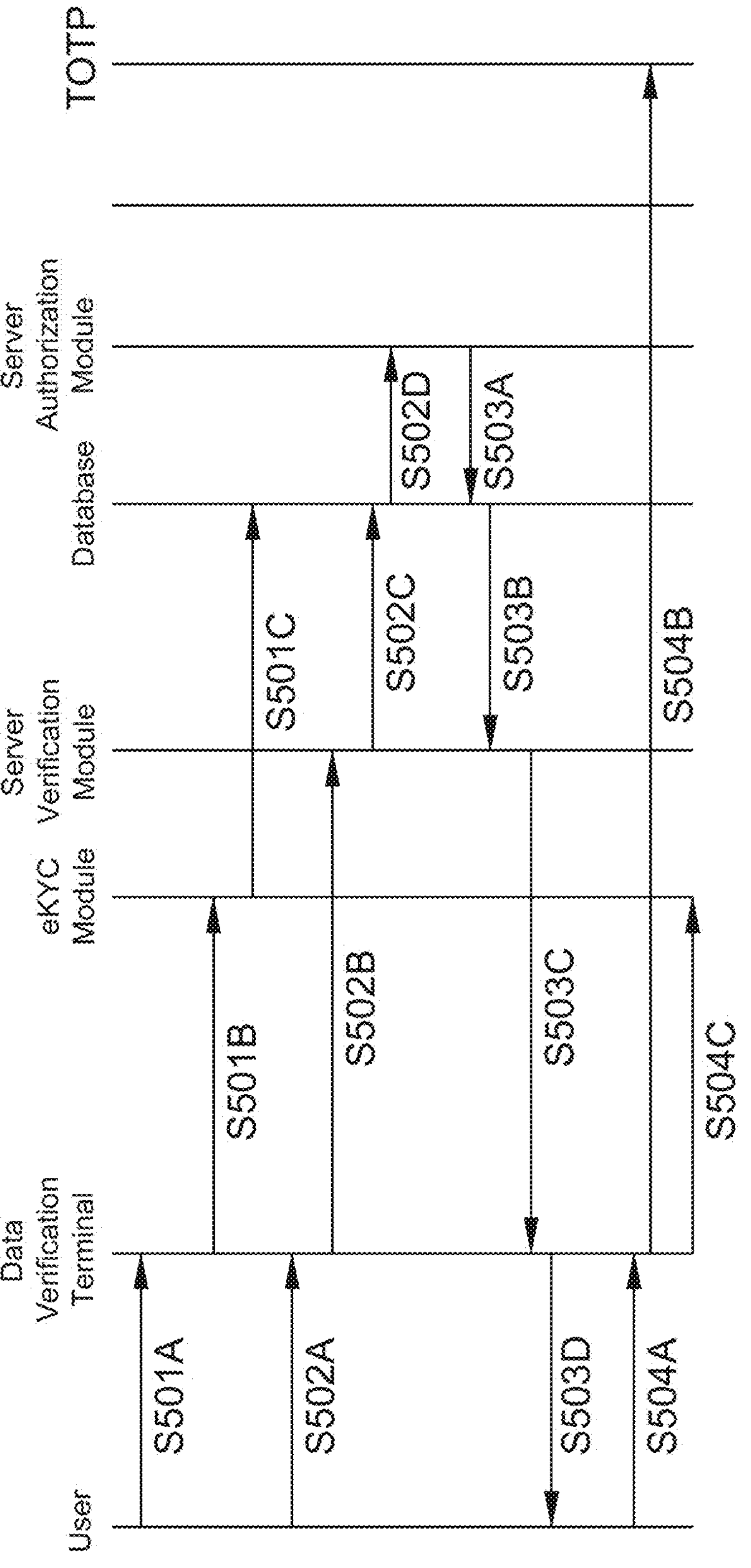
FIG. 5 is a flowchart illustrating a process of registering and performing transaction authorization according to an embodiment of the present disclosure.

FIG. 5 is a flowchart illustrating a process of registering and performing transaction authorization according to an embodiment of the present disclosure. When implementing embodiment of the present disclosure, the user must first register and create some aggregated data. These actions can be simply presented as shown in steps S501A to 501C. In step S501A, the user launches the APP. Then, in step S501B, the data verification terminal (e.g., APP) can use a variety of verification methods, for example, by using the ekYC module, to perform verification for the user's identity, for example, by utilizing image capture of the ID card, face recognition, and video activation to request user to engage in a specific interaction. This step can enhance security of data verification during registration and/or subsequent usage. The data verification server then provides the information used for data verification and the information provided by the user for the initial registration, such as various ID card information, driver's license information, health insurance card information, credit card information, natural person certificate information, etc. After these pieces of information are transmitted to the data verification server, a connection information corresponding to the user can be created in the database of the data verification server.

In a use case, the user first launches and logs in to the APP in step S502A, and then the APP can proceed with step S502B to request the data verification server to allow the user to log in. The server verification module of the data verification server can access the database in step S502C to determine whether the user is a registered user. Then, in step S502D, the server authorization module of the data verification server selectively obtains one or more pieces of aggregated data from the database based on a verification value and transmits the obtained aggregated data through the communication network (step S503A to step S503D). In FIG. 5, the aggregated data is transmitted back to the data verification terminal (e.g., mobile phone APP). In the present embodiment, the user or the APP can determine whether to modify part of the information (e.g., updating the issuance date of the ID card or updating the passport number) of the aggregated data in step S504A. Then, the final aggregated data, regardless of whether modified or updated, is transmitted to, for example, the bank to obtain TOTP in step S504B, and the updated aggregated data is transmitted back to the data verification server in step S504C.

Figure 6A:
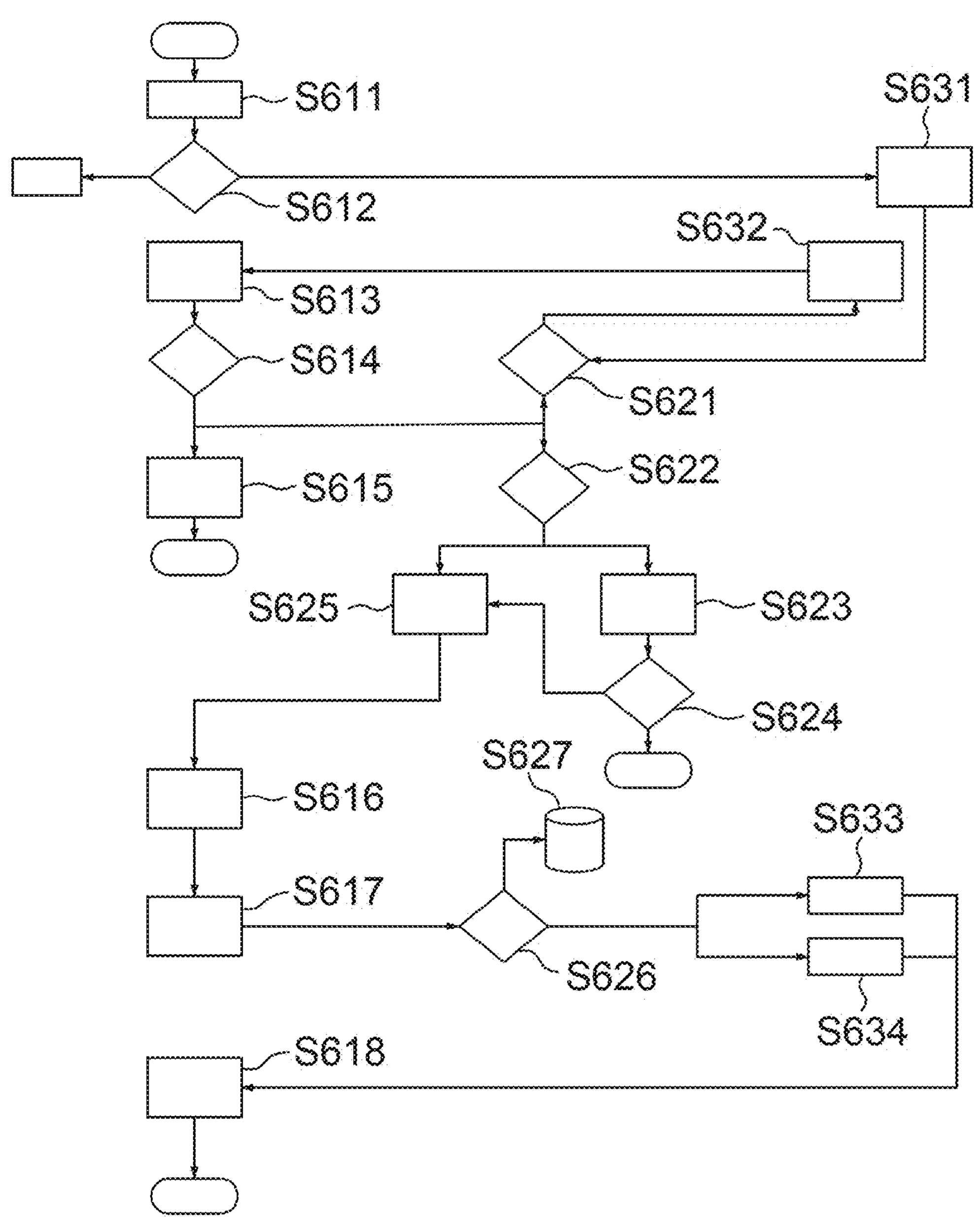
FIG. 6A is a flowchart illustrating a process of registering and performing transaction authorization according to another embodiment of the present disclosure.

FIG. 6A is a flowchart illustrating a process of registering and performing transaction authorization according to another embodiment of the present disclosure. In another embodiment, in step S611, the user may operate the data verification terminal (e.g., mobile phone) to perform a credit card transaction. Then, in step S612, regarding the selection of the verification method, if SMS message or mailbox verification is not selected, the system provided by the present disclosure can be used for verification and request a third party (e.g., a bank) to initiate a verification request to the data verification server in step S631. Then, in step S621, the data verification server determines whether the user is registered. If not, the data verification server notifies the third-party bank's host, and the third-party bank's server can perform step S632 to transmit a registration request message, such as a link for APP download for registration, to the user's data verification terminal. After receiving the message, if the user agrees with the registration request, the data verification terminal (e.g., mobile phone) performs step S613 to download the APP and run APP to do the registration. In step S614, the APP determines whether the registration is successful. If the registration fails, a registration failure message is displayed in step S615. On the other hand, if the registration is successful, or if the data verification server determines that the user is registered in the aforementioned step S621, then the data verification server determines whether the credit card is bound to the user's registration information in step S622. If it is determined that there is no bound credit card, the credit card binding process is performed in step S623. Such a binding process is the same as a general credit card verification process and thus will not be described in detail in the present disclosure. Then, in step S624, it is determined whether the credit card can be successfully bound. If the binding process fails, the process ends. At this point, the user can choose to return to step S611 or use SMS verification to proceed with the transaction.

If it is determined that the credit card binding is successful in step S624, or if it is determined that the credit card information already exists or has been bound to the user registration information in step S622, then step S625 is performed to start requesting the data verification terminal to perform identity verification. The data verification terminal performs the identity verification in steps S616 and S617 to determine that the user is a valid user and transmit a verification result to the data verification server. In step S626, the data verification server determines whether the verification is passed and then stores the data to the database. If the verification is successful, the third-party bank is authorized in step S633. On the contrary, if the verification fails, the authorization to the third-party bank is rejected in step S634. In any case, the data verification terminal can display the transaction result in step S618.

Figure 6B:
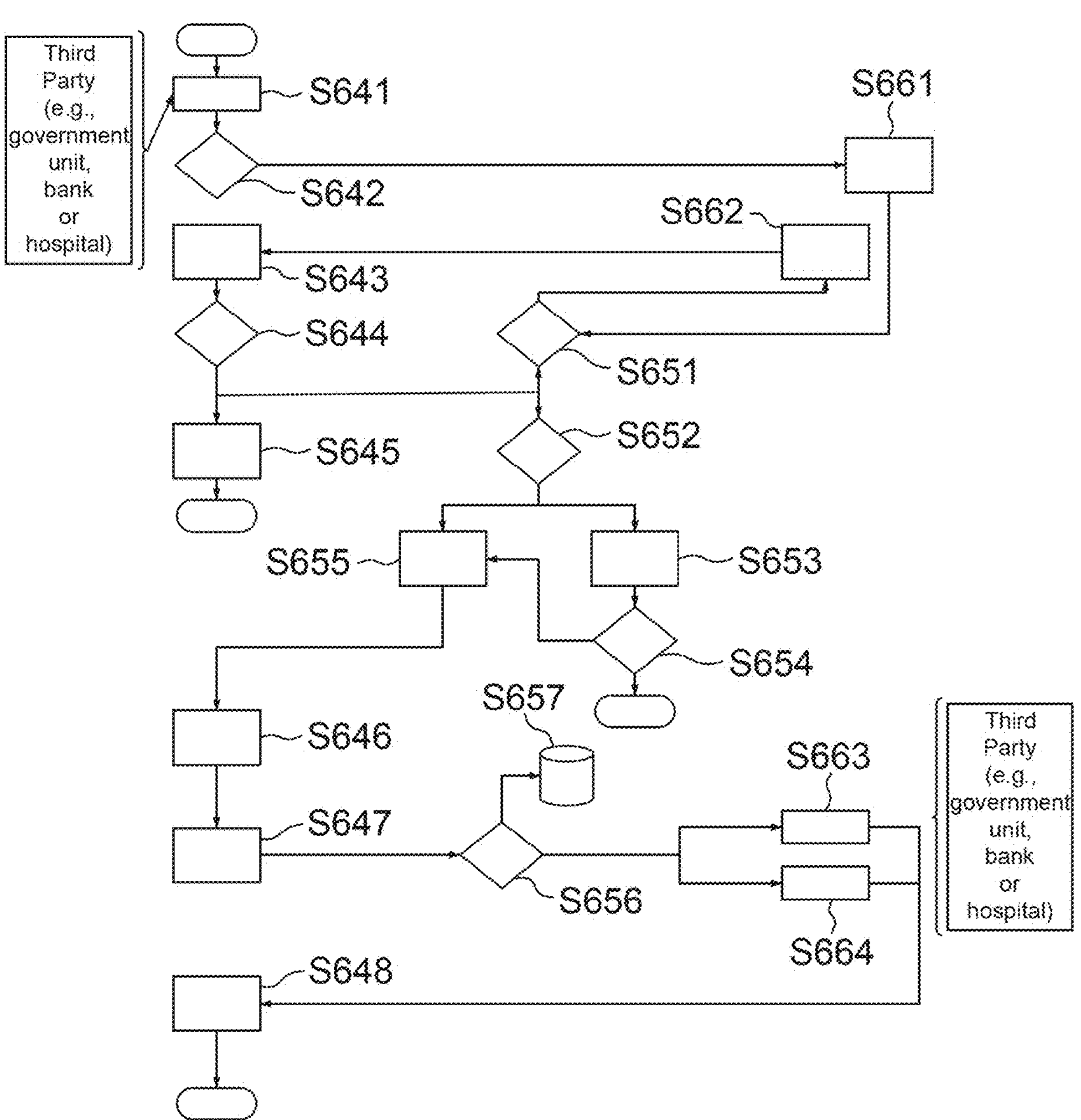
FIG. 6B is a flowchart illustrating a process of registering and performing transaction authorization according to a further embodiment of the present disclosure.

FIG. 6B is a flowchart illustrating a process of registering and performing transaction authorization according to a further embodiment of the present disclosure. In the present embodiment, in step S641, the user operates the data verification terminal (e.g., mobile phone) not to conduct a credit card transaction, but to provide personal information to a third party such as bank, travel agent, hospital, government unit, or general enterprise. Then, in step S642, the data verification terminal is activated to request a third party (e.g., a bank) to initiate a verification request to the data verification server in step S661. Then, in step S651, the data verification server determines whether the user is registered. If not, the data verification server notifies the third-party bank's host, and the third-party bank's server can perform step S662 to transmit a registration request message, such as a link for APP download for registration, to the user's data verification terminal. After receiving the message, if the user agrees with the registration request, the data verification terminal (e.g., mobile phone) performs step S643 to download the APP and run APP to do the registration. In step S644, the APP determines whether the registration is successful. If the registration fails, a registration failure message is displayed in step S645. On the other hand, if the registration is successful, or if the data verification server determines that the user is registered in the aforementioned step S651, then the data verification server determines whether aggregated data for authorization is bound to the user's registration information in step S652. If it is determined that there is no binding aggregation data for authorization, an authorization data (i.e., aggregated data) binding process is performed in step S653. This process is as described in other previous embodiments of the present disclosure and will not be described again herein. Then, in step S654, it is determined whether one or more pieces of certificate data can be successfully bound as the authorization data. If the binding process fails, the process ends.

If it is determined that the aggregation data for authorization is successful bound in step S654, or if it is determined that the aggregation data for authorization already exists or has been bound to the user registration information in step S652, then step S655 is performed to start requesting the data verification terminal to perform identity verification. The data verification terminal performs the identity verification in steps S646 and S647 to determine that the user is a valid user and transmit a verification result to the data verification server. In step S656, the data verification server determines whether the verification is passed and then stores the data to the database. If the verification is successful, the third-party bank is authorized for personal data in step S663. On the contrary, if the verification fails, the authorization for personal data to the third party is rejected in step S664. In any case, the data verification terminal can display the transaction result in step S648.

Embodiment 7: User Interface and Operation

Figure 7:
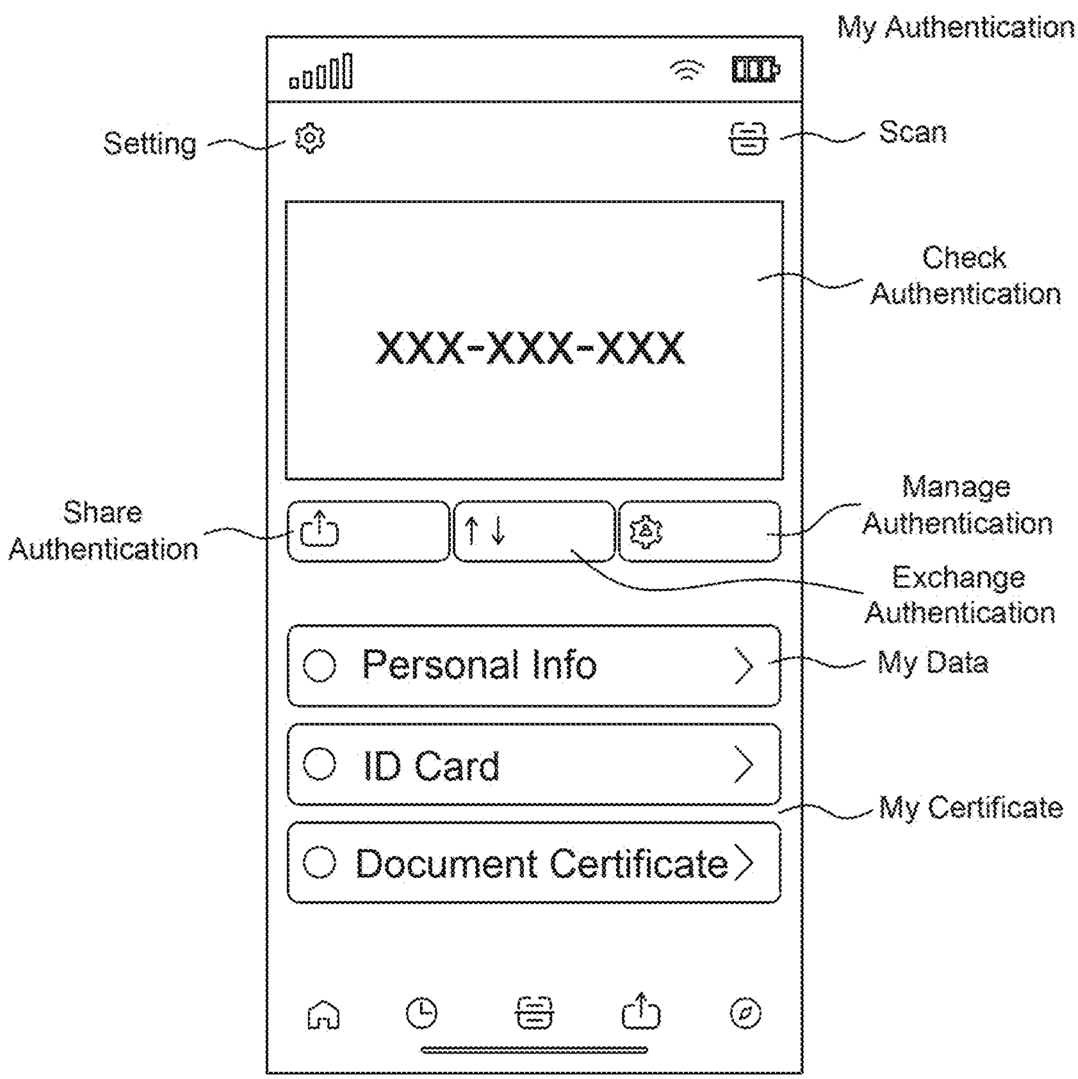
FIG. 7 is a schematic diagram of a user interface of a data verification terminal according to an embodiment of the present disclosure.

FIG. 7 is a schematic diagram of a user interface of a data verification terminal according to an embodiment of the present disclosure. As shown in FIG. 7, the user interface of the data verification terminal features a settings button for users to make detailed configurations, and a scan button for users to activate the camera to capture images for corresponding verifications, for example, for biometrics, facial recognition, and document capture. The user interface also includes current authentication data (e.g., aggregated data that can be transmitted at any time) and features a share authentication button for users to authenticate anytime by using the current authentication data, an exchange authentication button for users to adjust the aggregated data to be used for authentication, and a manage authentication button for users to easily add or delete data. In addition, the aggregated data can be generated from personal information, identity documents (e.g., images of ID cards, health insurance cards, driver's licenses, passports and other documents), document certificates (e.g., graduation certificates or other documents that can be used as authentication information).

Figure 8A:
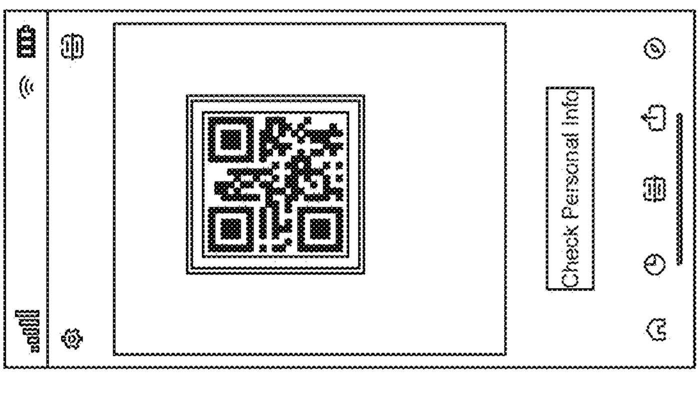
FIG. 8A and FIG. 8B are schematic diagrams of operation statuses on a user interface of a data verification terminal according to an embodiment of the present disclosure.
Figure 8A:
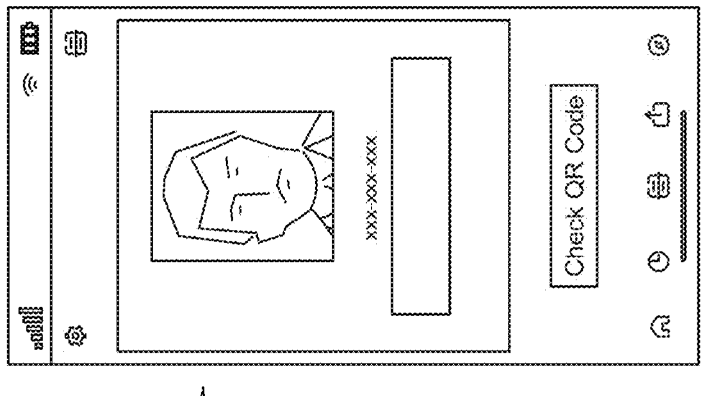
Figure 8A:
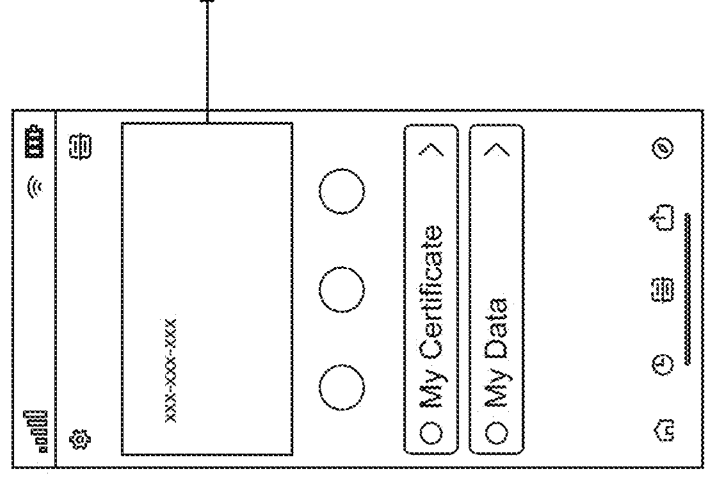
Figure 8B:
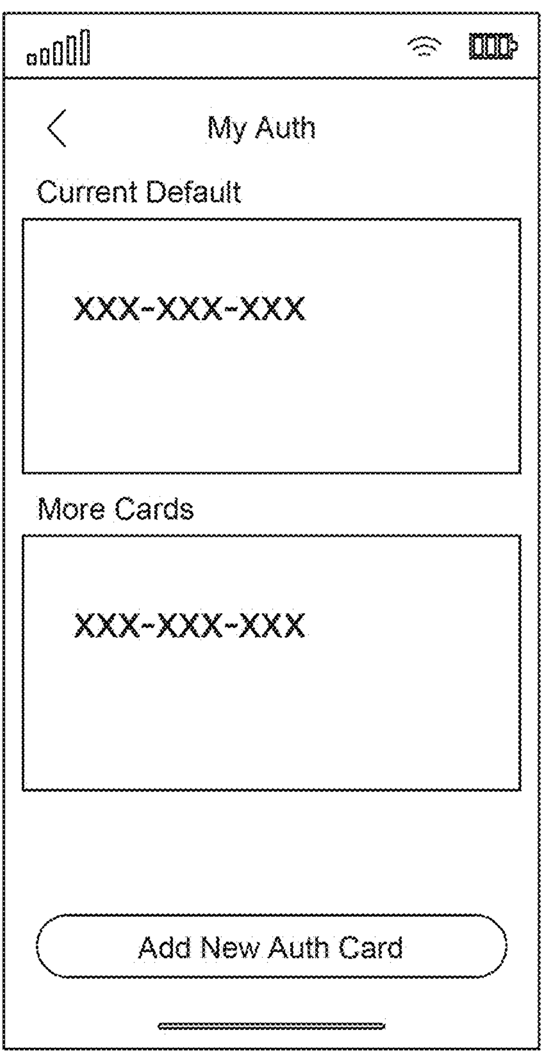

FIG. 8A and FIG. 8B are schematic diagrams of operation statuses on a user interface of a data verification terminal according to an embodiment of the present disclosure. In a use case, for example, if someone would like to purchase alcoholic beverages in the UK, the purchaser must be at least 25 years old according to UK law. Therefore, the user operates the user interface to present human-readable data or machine-readable 2D barcodes showing that the age of the user has been verified to be over 25 years old. If the user needs to use a credit card to purchase a ticket, the user can select the exchange authentication button in the user interface and enter the page as shown in FIG. 8B to select an appropriate authentication button for a quick card transaction.

Embodiment 8: Data Update

Figure 9:
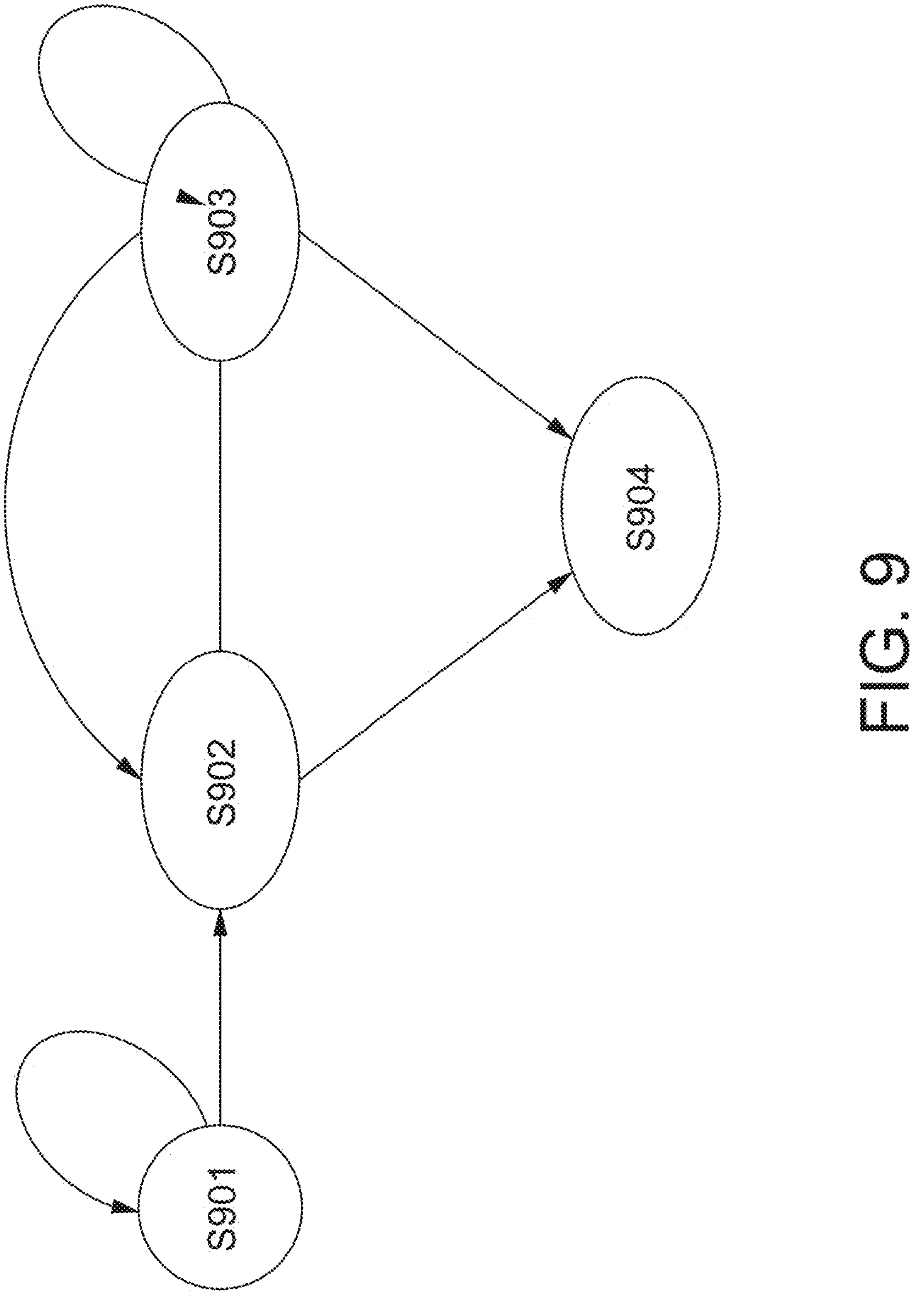
FIG. 9 is a flowchart illustrating a data update status of a data verification terminal according to an embodiment of the present disclosure.

FIG. 9 is a flowchart illustrating a data update status of a data verification terminal according to an embodiment of the present disclosure. When the user launches the APP, in Step S901, the APP may request the user to input a password, scan a fingerprint, or use facial recognition to determine whether the user data is valid. If the user data is not valid, the APP can start a registration process from the beginning to create registration data. If the user data is valid, step S902 is performed to determine whether the user's data for authentication is legal. For example, some documents (e.g., passports or natural person certificates) have a validity period and must be renewed if the period expires. In addition, in this step, the APP can also provide a pop-up window to allow the user to determine whether a part of the information for authentication needs to be updated. For example, if the user has recently renewed their ID card due to marriage or divorce, or if the user has recently lost their passport and applies for a replacement passport, this part of the information for authentication needs to be updated. If it is determined that the information for authentication is correct, the information for authentication will be archived in step S904. Otherwise, the information for authentication is updated in step S903. If attempts to update multiple times (e.g., three times) fail, the information for authentication will be archived and marked as pending update. If the update is successful, return to step S902 to continue to determine whether there is other data that needs to be updated.

Embodiment 9: Preparation of New Authentication Information

Figure 10:
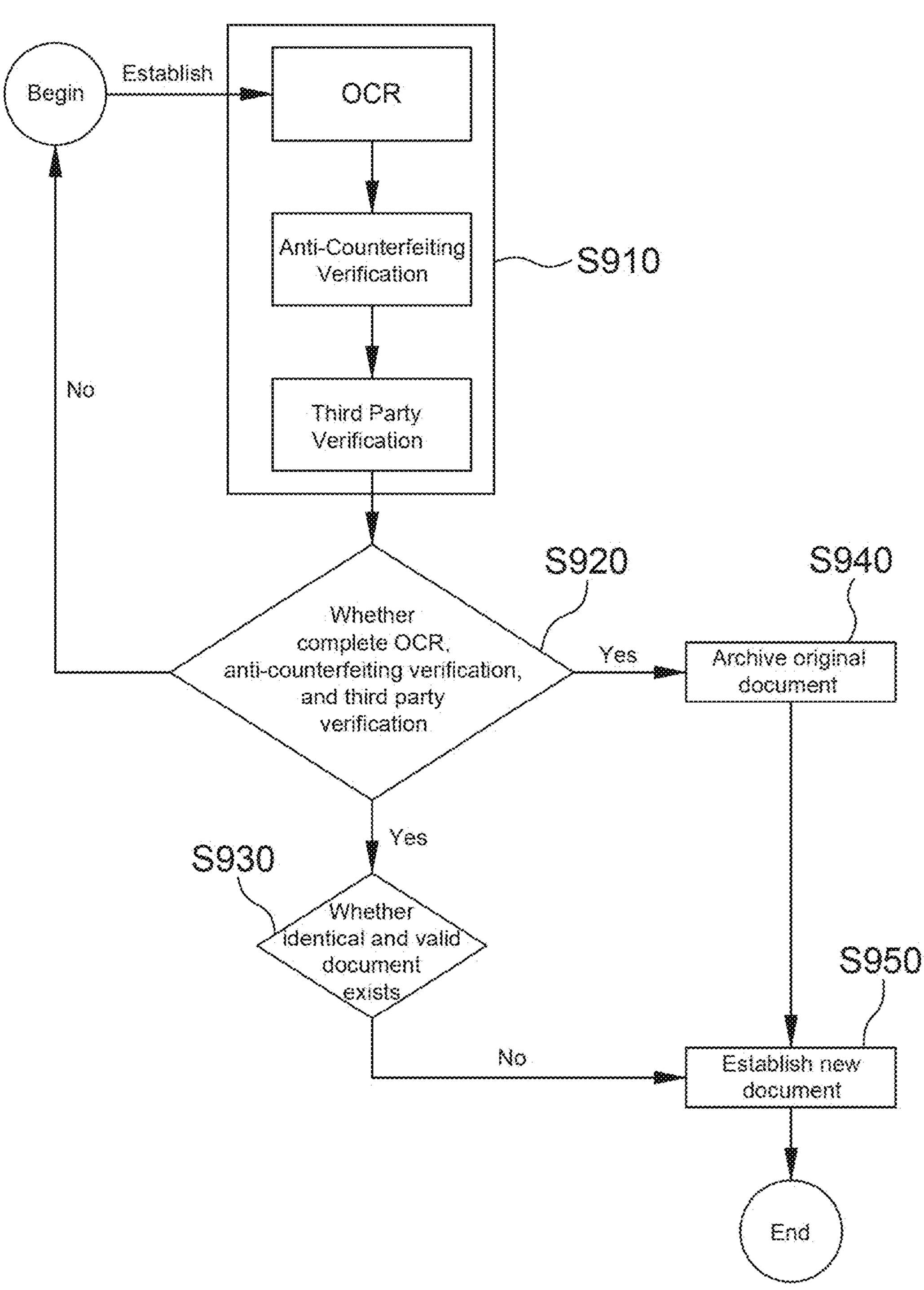
FIG. 10 is a schematic diagram of an authentication data establishment process performed by a data verification terminal according to an embodiment of the present disclosure.

FIG. 10 is a schematic diagram of an authentication data establishment process performed by a data verification terminal according to an embodiment of the present disclosure. First, in Step S910, to ensure the accuracy and legitimacy of the document data, the user should use an official identity document for optical character recognition (OCR) to read the document and may optionally use methods from other embodiments of this disclosure to perform anti-counterfeiting verification, or optionally have verification conducted by a third party, for example, by inserting a natural person certificate card to a reader to connect with a government agent for verifying the validity of the natural person certificate card. Next, in step S920, the data verification terminal determines whether optical character recognition and/or related verification procedures are completed. If not, return to step S910. Otherwise, step S930 is performed to connect with the local end or the data verification server to determine whether an identical and valid document already exists. If the local end or the data verification server has the same document, the data of the original document is archived in step S940, and step S950 is performed to create data of the new document for future authentication. On the contrary, if it is determined that the local side and/or the data verification server does not have the same document, the data of the document can be directly created on the local side and/or the data verification server side.

Figure 11A:
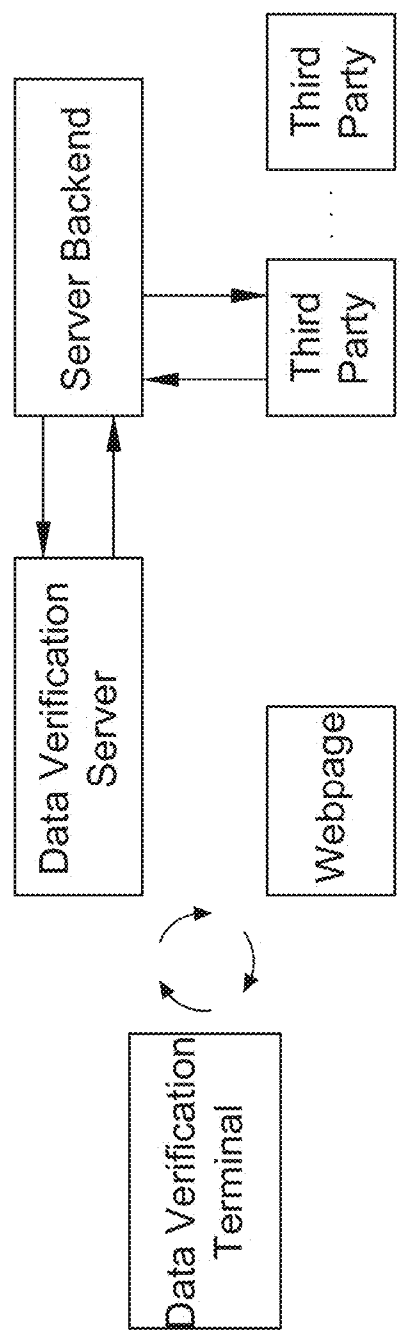
FIG. 11A and FIG. 11B are conceptual diagrams of an embodiment of the present disclosure.
Figure 11B:
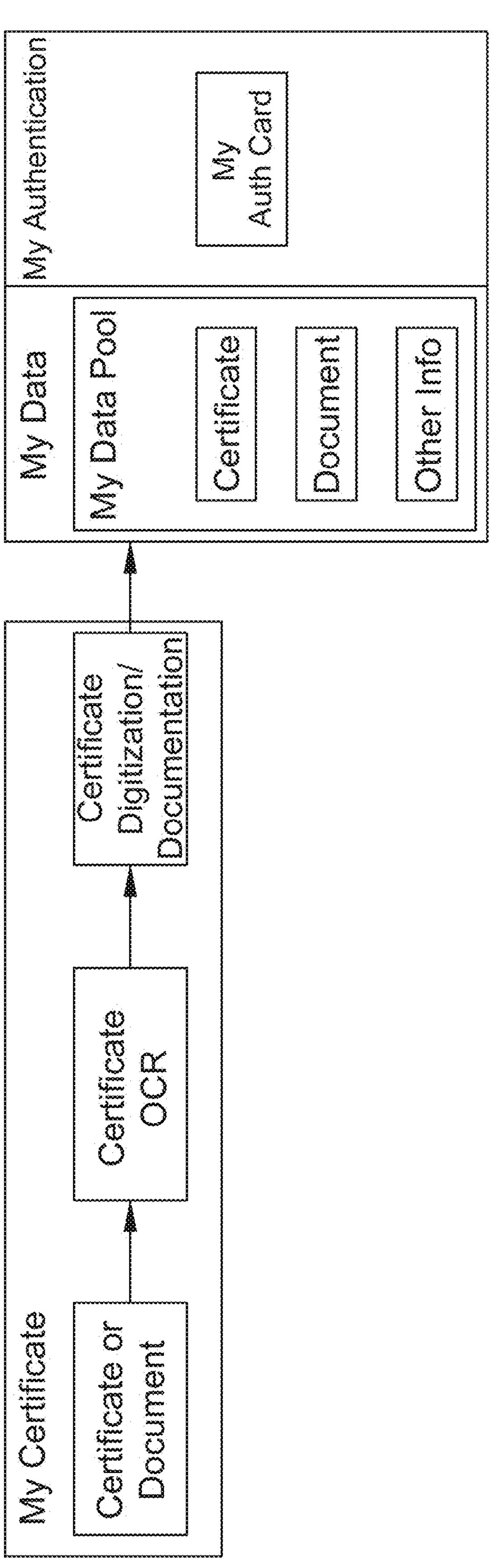

In summary, one of the concepts of the present disclosure can be referenced in FIG. 11A and FIG. 11B, which illustrate a conceptual diagram according to one embodiment of the present disclosure. The present disclosure provides a system architecture as shown in FIG. 11A. The system facilitates the user to operate the data verification terminal and interact with the data verification server. For example, when data verification is conducted directly or through a webpage with a third party, such verification involves not only the interaction between the data verification terminal and the third party but also the data exchange with the third party after the verification perform by the data verification server and its backend. In addition, as shown in FIG. 11B, one or more of the user's certificates or documents are processed through optical character recognition (OCR) to form individual data, which is then verified and documented before being stored to the database of the data verification server to forms the user's information pool. Users can recreate an authentication card (Auth Card) based on actual usage needs, where the Auth Card contains only the necessary information required for specific authentication, thus reducing the risk of unrelated information leakage.

The data verification system provided by the present disclosure achieves a high-security, high-reliability, and high-performance data verification process through the combination of multiple advanced technologies. With hashing algorithm and TOTP technology to encrypt biometric data, the confidentiality and integrity of the data during transmission can be ensured. At the same time, with the collaboration between the server and the terminal, fast and accurate identity verification is achieved, thus providing users with safe and reliable services.

The system of the present disclosure is not only applicable to fields requiring high security, such as finance and e-commerce, but can also be applied to emerging fields like smart cities and the Internet of Things, thus showing broad application prospects. With the continuous development of technology, the system of the present disclosure can be further optimized and improved to provide a better user experience and higher security.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A data verification server, comprising:

a server registration module configured to receive a plurality pieces of registration data comprising a plurality pieces of personal information extracted from at least two different types of identity documents of a user, and to process the plurality pieces of registration data to generate one or more pieces of aggregated data by combining at least two of the plurality pieces of personal information based on a verification method that is provided by a service platform comprising a service platform server:

a database connected with the server registration module and configured to store verification check data and the one or more pieces of aggregated data;

a server verification module connected with the database and configured to receive verification data from a data verification terminal, and to compare the received verification data and the verification check data stored in the database to determine whether the received verification data and the stored verification check data match; and a server authorization module connected with the server verification module and the database, wherein;

when the received verification data and the verification check data stored in the database match, the server authorization module selectively obtains the one or more pieces of aggregated data from the database and transmits in response to an authorization request transmitted by the service platform server the one or more pieces of aggregated data obtained to the service platform server through a communication network.

2. The data verification server of claim 1, wherein when the data verification terminal is verified to be operated by the user, the server authorization module is configured to update a part of the one or more pieces of aggregated data in the database based on one or more data aggregation instructions received from the data verification terminal.

3. The data verification server of claim 1, wherein the server authorization module is configured to store in the database an authorization record regarding the one or more pieces of aggregated data provided to the data verification terminal.

4. The data verification server of claim 3, wherein the server authorization module, when receiving the one or more data aggregation instructions, determines whether one of the one or more pieces of aggregated data stored in the database corresponds to the one or more data aggregation instructions to selectively update the part of the one or more pieces of aggregated data in the database.

5. The data verification server of claim 1, wherein the server verification module includes a verification kernel that complies with Fast Identity Online 2 (FIDO2) project and uses an authentication standard of Universal 2nd Factor for verification.

6. The data verification server of claim 1, wherein the server authorization module transmits the one or more pieces of aggregated data obtained to the service platform server through the communication network to complete authorization.

7. A data verification terminal, comprising:

a terminal connection module connected with a data verification server and a service platform server through a communication network;

a terminal authorization module connected with the terminal connection module and configured to receive an authorization request from the service platform server through the terminal connection module; and a terminal verification module connected with the terminal connection module and the terminal authorization module and configured to obtain biometric data and generate verification data based on the obtained biometric data, wherein:

when the terminal authorization module receives the authorization request, the terminal verification module is configured to transmit the verification data to the data verification server through the terminal connection module, such that the data verification server transmits, in response to the authorization request, one or more pieces of aggregated data to the service platform server, wherein:

the one or more piece of aggregated data is generated by the data verification server combining at least two of a plurality pieces of personal information extracted from at least two different types of identity documents of a user based on a verification method that is provided by a service platform comprising the service platform server.

8. The data verification terminal of claim 7, further comprising:

a terminal registration module connected with the terminal connection module and configured to obtain one or more pieces of registration data of a user, and to transmit the one or more pieces of registration data to the data verification server through the terminal connection module.

9. The data verification terminal of claim 7, wherein the terminal verification module is configured to generate an authorization password based on a time-based one-time password (TOTP) algorithm by using a verification time interval to obtain the verification data, to encrypt the verification data with the authorization password, and to transmit the encrypted verification data to the data verification server through the terminal connection module.

10. The data verification terminal of claim 7, wherein when the terminal connection module receives one piece of aggregated data from the data verification server, the terminal authorization module generates an authorization password based on a time-based one-time password (TOTP) algorithm by using an authorization time interval to obtain the one piece of aggregated data, to encrypt the one piece of aggregated data with the authorization password, and to transmit the encrypted piece of aggregated data to a verification platform through the terminal connection module.

* * * * *